Figure 1:
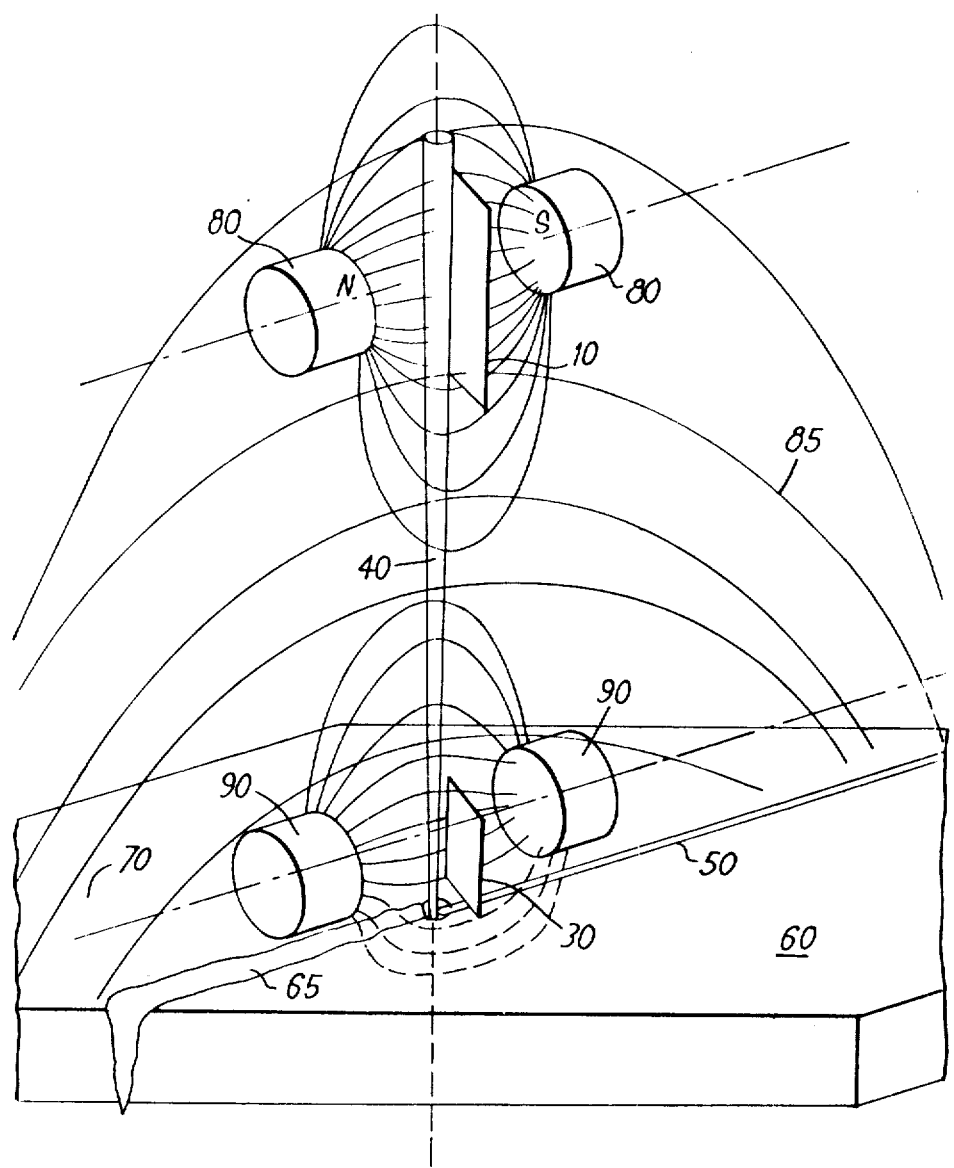

United States Patent [19]
Möench et al.

[11] 4,223,200
[45] Sep. 16, 1980

[54] CHARGED PARTICLE BEAM PROCESSING WITH MAGNETIC FIELD COMPENSATION

[75] Inventors: Clauspeter Möench, Grafrath; Wilhelm Scheffels, Puchheim; Dieter König, Munich; Karl H. Steigerwald, Starnberg, all of Fed. Rep. of Germany

[73] Assignee: Steigerwald Strahltechnik G.m.b.H., Fed. Rep. of Germany

[21] Appl. No.: 922,503

[22] Filed: Jul. 6, 1978

[30] Foreign Application Priority Data

Jul. 6, 1977 [GB] United Kingdom ............... 28358/77

[51] Int. Cl.² ............................................. B23K 15/00
[52] U.S. Cl. ...................... 219/121 EB; 219/121 EM
[58] Field of Search .................. 219/121 EB, 121 EN, 219/121 P, 122, 123

[56] References Cited
U.S. PATENT DOCUMENTS

| 1,854,536 | 4/1932 | Wilson | 219/123 |
| 2,844,705 | 7/1958 | Bowman et al. | 219/123 X |
| 2,994,763 | 8/1961 | Schultz | 219/123 |
| 3,626,145 | 12/1971 | Jackson | 219/123 |

*Primary Examiner*—C. L. Albritton
*Attorney, Agent, or Firm*—Brumbaugh, Graves, Donohue & Raymond

[57] ABSTRACT

A device for compensating for spurious magnetic fields in an energy beam device includes first and second pairs of electromagnetic poles arranged along the particle path and providing magnetic fields to compensate for spurious magnetic fields which might cause the beam of charged particles to deviate from the desired beam path.

7 Claims, 3 Drawing Figures

CHARGED PARTICLE BEAM PROCESSING WITH MAGNETIC FIELD COMPENSATION

This invention relates to a method and apparatus for compensating for spurious magnetic fields in charged particle beam apparatus.

In welding or other fabricating processes using charge carrier beams (in particular electron beams), there are often cases in which, undesirably, magnetic fields issuing from the workpieces and having a direction which is parallel to the surface thereof both deflect the beam from a desired position (for example, the centre of a weld seam), and so change its originally perpendicular direction with respect to the workpiece surface that defects are produced in the quality of the result of the fabricating operation. This is especially so in the welding of large workpiece thicknesses.

The quality of the result of an electron or other beam welding process (and comparable electron or other beam machining operations, such as perforating, boring, engraving, milling) is thus often impaired by more or less localized areas of remanent magnetization of workpieces of magnetizable materials. The invention relates to a method and an apparatus to compensate for such undesired magnetic fields which deflect the electron or other beam on its path from the electron or other gun to the workpiece surface. In the method of the invention, one or several components of the spurious magnetic field is measured by an appropriate probe, such as a Hall-effect detector or a so-called Forster probe, and a compensating magnetic field is produced by an electromagnet, the energizing current of which is so controlled that the magnetic field sensed by the corresponding probe is minimized. One of these components of the spurious magnetic fields may extend in a direction parallel to the seam to be welded as in the examples described hereinafter with reference to the accompanying drawings. However, there is no restriction of the invention in regard to the direction of the field to be compensated. In particular, it is possible to compensate two surface-parallel components of spurious magnetic field which are perpendicular to each other by simultaneously using two systems of the type described in the following with respectively orientated field probes and electromagnets, each of the two systems compensating for a respective one of the two components of spurious magnetic field.

The basis of the idea of the invention is to detect these spurious magnetic fields above the workpieces very close to the beam from zones close to the workpiece and up to several decimeters—as seen in the direction opposite to that of the beam—by means of at least two or more magnetic field probes (e.g., Hall probes) and to compensate for them to such an extent by means of at least two or more field coils, the directions of whose fields extend parallel to the field lines of the spurious or interference fields, that the amount both of interfering deflection and of change of direction of the change carrier beam falls below a fixed tolerance limit or become nil.

Figure 2:
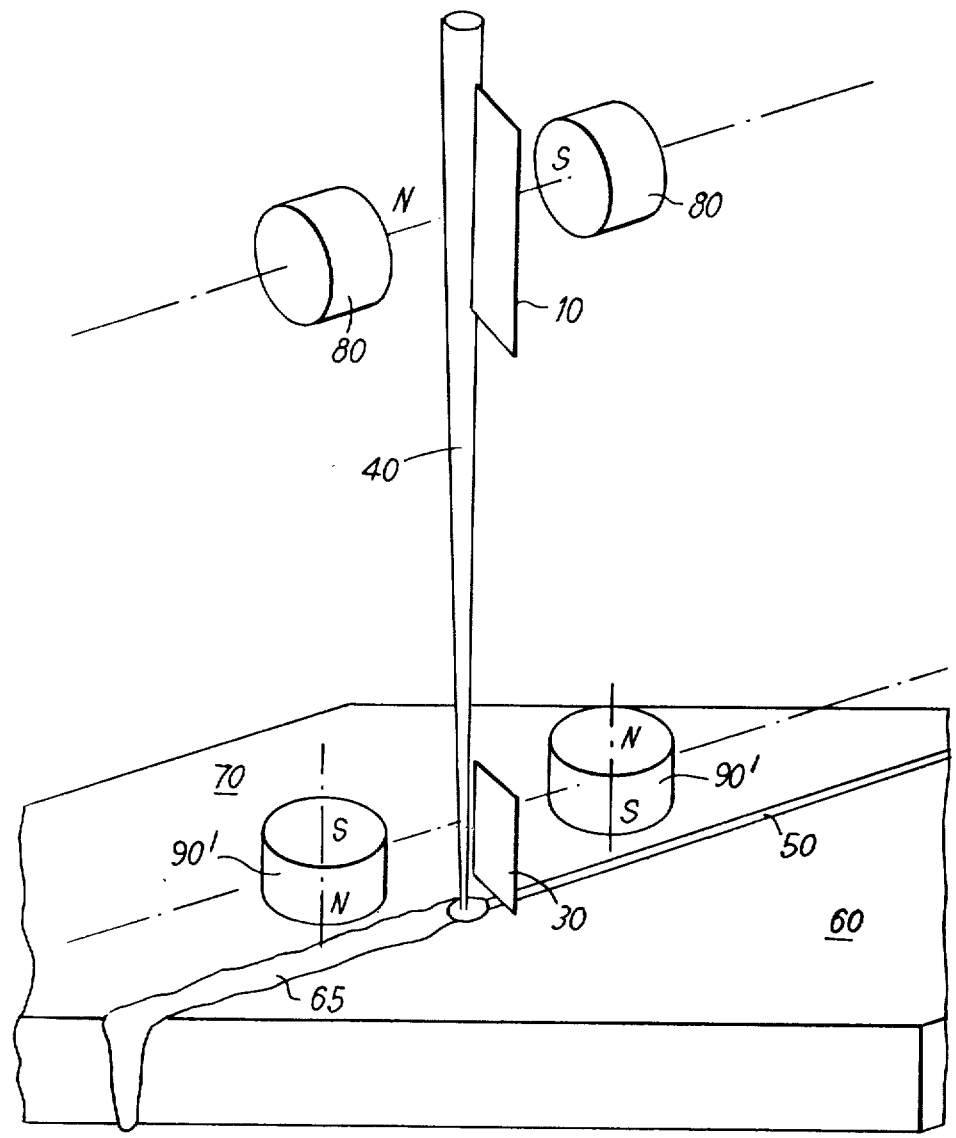
Figure 3:
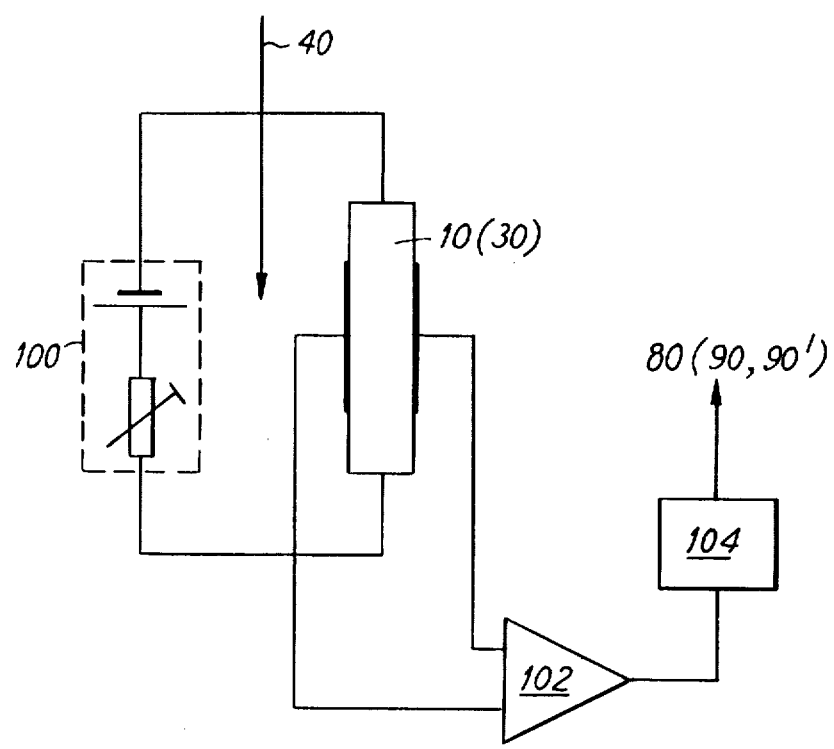

The invention will now be described in more detail, solely by way of example, with reference to the accompanying drawings in which FIGS. 1 and 2 are diagrammatic perspective views of different embodiments of the invention, and FIG. 3 is a circuit diagram of a regulating circuit which can be used in an apparatus according to the invention.

FIG. 1 shows a possible arrangement according to the invention of, for example, two magnetic field probes 10, 30, which are so aligned here that they register magnetic fields of that direction which deflects the charge carrier beam 40 perpendicularly to a weld gap (or joint) 50. Of course, other embodiments of the invention can be applied to other magnetic field directions. FIG. 1 moreover shows the already welded portion 65 of two workpieces 60 and 70 to be welded together.

The magnetic field probes 10, 30 are disposed at different heights above the workpieces 60 and 70, preferably so that at least one probe (30) is as close as possible above the surfaces of the workpieces. Also shown in FIG. 1 are two pairs of field coils 80, 90 by means of which magnetic fields of that direction which is registered by the probes 10, 30 can be produced. FIG. 1 shows only two pairs of coils, but this is not intended to signify any limitation of the invention. In principle, as many probes and pairs of coils may be used as in the result of the requirements of accuracy of a particular arrangement. The axes of the coils preferably pass through the surfaces of the probes at their centres. The probes are made as elongated as possible in order to register the value of the magnetic field averaged over a large range in the direction of the charge carrier beam. The magnetic field probes 10, 30 and the associated pairs of coils are fixedly connected to the charge carrier beam generating system (not shown here).

Compensation then takes place in the simplest manner by each of the pairs of coils present being energized by a correcting current which is so proportioned that the magnetic field strength measured in the associated probe becomes nil or falls below a tolerance limit adapted to the requirements of accuracy of the particular fabricating process using the charge carrier beam. In this way, it is possible to compensate piecemeal or zone-wise for a stray magnetic field 85 emanating from "remanence islands" of the workpiece. The number of these zones (i.e., also the number of probes and compensating coils) can again be chosen in accordance with the requirements of accuracy.

According to FIG. 2, it is furthermore possible to arrange that pair of coils 90' which is disposed close to the surfaces of the workpiece 60, 70 so that two of their magnet poles are directly opposite the surfaces of the workpieces.

The embodiments shown in FIGS. 1 and 2 can be modified by using a single magnetic field probe and an associated single pair of coils only. In such case, preferably the remaining system is positioned close to the workpiece surface.

According to a further modification of the embodiments shown, two pairs of coils are used instead of any of the pairs 80, 90 and/or 90' shown, the additional pair being positioned at essentially the same distance from the workpiece surface as the first pair, and the pairs are offset in angular direction with respect to the beam axis e.g. by 90 degrees, so that two components of a magnetic field in a plane which is parallel to the surface of the workpiece can be compensated. This is shown in dotted lines in FIG. 2.

FIG. 3 shows a circuit which can be used in the embodiments just described. A current source 100 is connected to electrodes at the longitudinal edges of the Hall probe 10 (30) to supply a bias d.c., which may be adjustable.

Electrodes at the transverse sides of the Hall probe are connected to the input terminals of a differential amplifier 102 which has its output connected to a power amplifier 104 which, in turn, supplies an energizing current to the pair of coils (90, 90′).

When the Hall probe 10 senses a magnetic field, the differential amplifier 102 will receive a corresponding voltage across its input terminals and deliver corresponding output signal to the power amplifier 102. The amplified output signal energizes the pair of coils 80 (90,90′9 in such a sense that the magnetic field produced by the coils compensates the spurious magnetic field which caused the output signal of the hall probe.

What we claim is:

1. In an apparatus having means for directing a high-energy beam of charged particles along a predetermined beam path onto a surface of a workpiece,
   a device for compensating for spurious magnetic fields tending to cause an undesirable deviation of said beam from said beam path, said device comprising:
   (a) first electromagnetic means having a first pair of pole pieces positioned mutually opposed and spaced along a first axis on opposite sides of said beam path adjacent said workpiece surface;
   (b) first magnetic probe means positioned between one of said first pole pieces and said beam path to provide a first output signal depending on the strength of a first component of a spurious magnetic field, said component extending essentially along said first axis;
   (c) first controllable current source means connected to said first electromagnetic means for supplying current thereto; said current source means being controllable by said first output signal to essentially compensate for said first magnetic field component;
   (d) second electromagnetic means having a second pair of pole pieces positioned mutually opposed and spaced along a second axis on opposite sides of said beam path at a location which is spaced from said workpiece surface beyond said first axis, said second axis extending essentially parallel to said first axis;
   (e) second magnetic field probe means positioned between one of said second pole pieces and said beam path to provide a second output signal depending on the strength of a second component of the spurious magnetic field, said component extending essentially along said second axis; and
   (f) second controllable current source means connected to said second electromagnetic means for supplying current thereto; said second current source means being controllable by said second output signal to essentially compensate for said second magnetic field component.

2. The device as claimed in claim 1 wherein said first and second axes extend essentially parallel to a direction of relative movement between said beam and said workpiece.

3. The device as claimed in claim 1 wherein there are provided:
   (a) third electromagnetic means having a third pair of pole pieces positioned mutually opposed and spaced along a third axis on opposite sides of said beam path adjacent said workpiece surface, said third axis essentially crossing said first axis;
   (b) third magnetic field probe means positioned between one of said third pole pieces and said beam path to provide a third output signal depending on the strength of a third component of the spurious magnetic field, said component extending essentially along said third axis;
   (c) third controllable current source means connected to said third electromagnetic means for supplying current to it; said third current source means being controllable by said third output signal to essentially compensate for said third magnetic field component;
   (d) fourth electromagnetic means having a fourth pair of pole pieces positioned mutually opposed and spaced along a fourth axis on opposite sides of said beam path at a location which is spaced from said workpiece surface beyond said first axis, said fourth axis extending essentially parallel to said third axis, said fourth axis essentially crossing said second axis;
   (e) fourth magnetic field probe means positioned between one of said fourth pole pieces and said beam path to provide a fourth output signal depending on the strength of a fourth component of the spurious magnetic field, said component extending essentially along said fourth axis; and
   (f) fourth controllable current source means connected to said fourth electromagnetic means for supplying current to it; said fourth current source means being controllable by said fourth output signal to essentially compensate for said fourth magnetic field component.

4. The device as claimed in claim 3 wherein said first and second axes extending essentially parallel to a direction of relative movement between said beam and said workpiece and said third and fourth axes extending essentially perpendicular to said direction of relative movement.

5. The device as claimed in claim 1 or 3 wherein at least one of said magnetic field probe means comprises a Hall probe which is elongaged in the direction of said beam path.

6. The device as claimed in claim 1, 2 or 3, wherein said first and third pair of pole pieces have faces facing along said beam path.

7. The device as claimed in claim 3, wherein at least one of said first, second, third or fourth pole pieces have faces facing each other.

* * * * *